Patented Feb. 17, 1925.

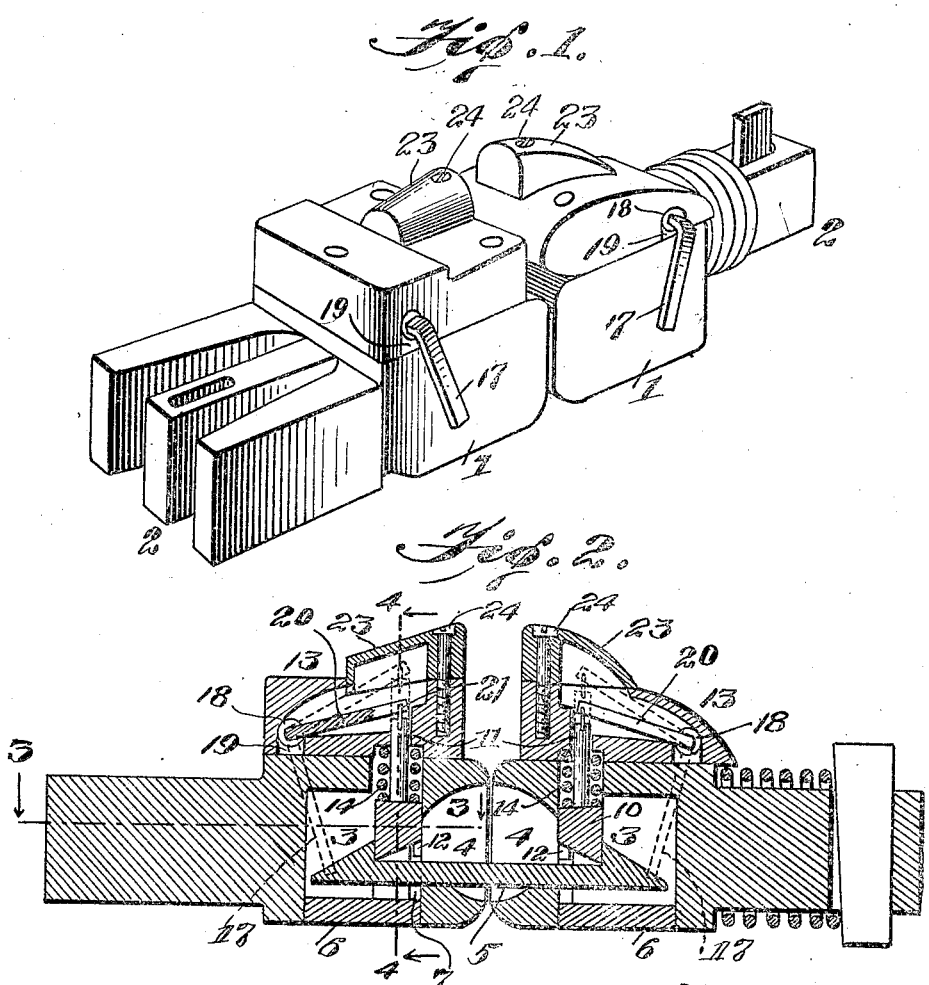
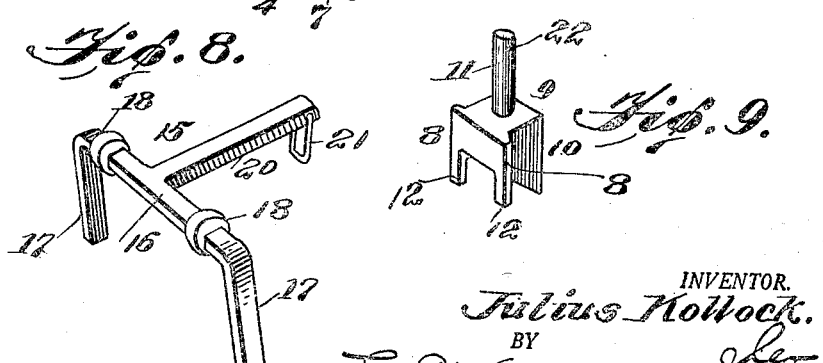

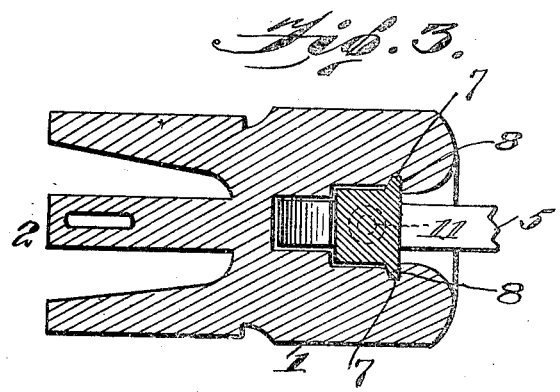
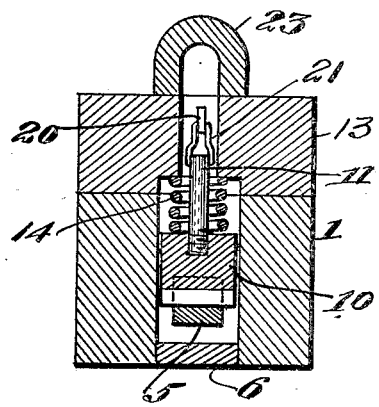
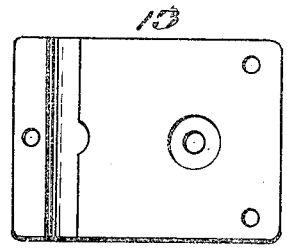
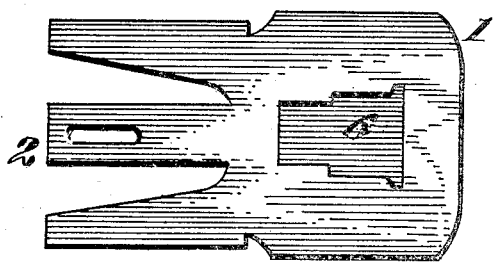

1,527,047

UNITED STATES PATENT OFFICE.

JULIUS KOLLOCK, OF HOMESTEAD, PENNSYLVANIA.

CAR COUPLER.

Application filed February 24, 1923. Serial No. 620,911.

*To all whom it may concern:*

Be it known that I, JULIUS KOLLOCK, a citizen of the United States, residing at Homestead, in the county of Allegheny and State of Pennsylvania, have invented certain new and useful Improvements in Car Couplers, of which the following is a specification, reference being had therein to the accompanying drawings.

This invention relates to a railroad car coupling apparatus.

The object of the invention is the construction of a simple and efficient coupling apparatus, which can be easily and quickly operated to either couple or uncouple cars, or the like.

With this and other objects in view, my invention comprises certain novel combinations, constructions and arrangements of parts as will be hereinafter described, illustrated in the accompanying drawings, and more particularly pointed out in the appended claim.

In the drawings:

Figure 1 is a perspective view of the apparatus constructed in accordance with the present invention, while Figure 2 is a longitudinal, vertical, sectional view of the same.

Figure 3 is a sectional view, taken on line 3—3, Fig. 2, and looking in the direction of the arrows.

Figure 4 is a sectional view, taken on line 4—4, Fig. 2, and looking in the direction of the arrows.

Figure 5 is a bottom plan view of one of the bumper bodies with the filler plate removed therefrom.

Figure 6 is a bottom plan view of the cap plate, while

Figure 7 is a view in side elevation of the same.

Figure 8 is a perspective view of one of the lever devices.

Figure 9 is a perspective view of one of the plunger devices.

Referring to the drawings by numerals, 1 designates the bumper bodies which are provided with extensions 2.

Each bumper body 1 is similarly constructed so that it will only be necessary to specifically describe one. The bumper body is provided with a central compartment 3 having an open end 4, and normally resting in ends 4 and compartments 3 of the two bumper bodies is the connecting bar 5. The lower portion of compartment 3, of each bumper body, is closed by a suitable filler plate 6. At opposite sides of the compartment 3 are vertical grooves 7, into which extends the flanges 8 of the latch 9.

The latch 9 comprises a head 10, carrying the flanges 8, and extending from the top of the head 10 is stem 11. Depending from flanges 8 are guide lugs 12 which guide lugs serve to direct the ends of the connecting bar into engagement with the lower end of the head 10, as clearly shown in Fig. 2.

A cap plate 13 is secured upon the top of the bumper body 1, and the stem 11 extends into the cap plate (Figs. 2 and 4). Positioned around the stem, between cap plate 13 and head 10, of plunger device 9, is a coil spring 14 for normally exerting downward pressure upon head 10.

In each cap plate 13 is mounted a lever device 15. The lever device 15 comprises a horizontal body or bar 16, provided at its ends with depending arms 17; these arms 17 are provided for operating the device. A pair of annular bearings 18 are formed upon the body (Fig. 8) 16, near the arms 17, and these bearings 18 normally rest upon bearing blocks 19 (Fig. 1). Extending at right angles from the body 16 is a straight finger 20. Mounted upon the outer end of finger 20 is a link 21 which is passed through the aperture 22 (Fig. 9) of stem 11, so that the plunger device 9 is pivotally connected to the lever device 15.

A cover plate 23 is secured by screw 24 upon the cap plate 13. If link 21 should be broken, by removing screw 24, the device may be repaired without removing cap plate 13. In the event the spring 14 should weaken or be broken it can be fixed, or a new spring substituted by removing cap plate 13.

It is to be understood that each bumper body is suitably supported upon a car, and is preferably desired to insert a connecting bar into one of the bodies so that it will be locked therein as shown in Fig. 2, and then upon the contiguous car being backed into engagement with the first bumper body, the second bumper body on the moving car will come into engagement with the first bumper body, causing one end of the connecting bar to enter the second-mentioned bumper body, permitting the bar to be locked in position and connect the two bumper bodies, as shown in Fig. 2. If it is desired to unfasten either of the latches to permit the two bumper bodies to move apart, all the operator has to do is to swing one of the arms 17 outwardly, causing the lever device to move to the position shown by dotted lines, Fig. 2, whereupon, connecting bar will be released at one end, permitting the two bumper bodies to move apart. Upon the operator releasing the lever device (by removing his hand from arm 17) the spring 14 will automatically return the latch to its lowest position, in the path of the connecting bar when the connecting bar enters the compartment 3.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

In an apparatus of the class described, a body having an open pocket for receiving a coupling bar and having a passage leading from its upper end and communicating with the pocket, a latch movable in the pocket and having a portion extending through the passage, a cap plate removably secured on said body and having a pocket communicating with the passage formed in the body and open at its upper end, the latch being extended into the pocket of the cap plates, latch adjusting means operating in the pocket of said cap plate, and a removable cover for the open end of the pocket in the cap plate.

In testimony whereof I hereunto affix my signature.

JULIUS KOLLOCK.